US012468860B2

(12) United States Patent
Paulraj et al.

(10) Patent No.: US 12,468,860 B2
(45) Date of Patent: Nov. 11, 2025

(54) SYSTEMS AND METHODS FOR MULTI-MODAL FIRMWARE UPDATES

(71) Applicant: Dell Products, L.P., Round Rock, TX (US)

(72) Inventors: Deepaganesh Paulraj, Bangalore (IN); Mahesh Babu Ramaiah, Bangalore (IN); Rama Rao Bisa, Bangalore (IN); Pavan Kumar Gavvala, Bangalore (IN); Manjunath Am, Bangalore (IN); Naveen Karthick Chandrasekaran, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 443 days.

(21) Appl. No.: 17/935,150

(22) Filed: Sep. 26, 2022

(65) Prior Publication Data

US 2024/0104251 A1   Mar. 28, 2024

(51) Int. Cl.
*G06F 21/73*   (2013.01)

(52) U.S. Cl.
CPC .................................. *G06F 21/73* (2013.01)

(58) Field of Classification Search
CPC .......... G06F 21/50; G06F 21/51; G06F 21/57; G06F 21/572
See application file for complete search history.

(56) References Cited

U.S. PATENT DOCUMENTS

| 6,085,332 A | * | 7/2000 | El-Batal | G06F 3/0689 710/1 |
| 7,069,452 B1 | * | 6/2006 | Hind | G06F 21/572 713/1 |
| 11,120,136 B1 | * | 9/2021 | BeSerra | G06F 21/572 |
| 2017/0235928 A1 | * | 8/2017 | Desai | G06F 21/572 713/2 |
| 2018/0150372 A1 | * | 5/2018 | Nachimuthu | G06F 7/06 |
| 2021/0264032 A1 | * | 8/2021 | Sayyed | G06F 9/441 |

* cited by examiner

*Primary Examiner* — Daniel B Potratz
(74) *Attorney, Agent, or Firm* — Fogarty LLP (57) ABSTRACT

Systems and methods provide multi-modal based updates to firmware utilized by a hardware component of an IHS (Information Handling System), where the firmware updates are managed by a remote access controller of the IHS that provides remote management of the hardware component. The remote access controller receives a notification of an update to an agreement for utilization of the hardware component, where the agreement indicates firmware modes authorized for use by the hardware component. Firmware modes are identified that are locally stored by the hardware component. Any firmware modes are identified that are authorized for use by the hardware component based on the updated first agreement and that are not locally stored by the hardware component, and the identified firmware modes are retrieved for local storage by the hardware component. In this manner, firmware utilized in an IHS remains consistent with applicable service agreements.

17 Claims, 4 Drawing Sheets

SYSTEMS AND METHODS FOR MULTI-MODAL FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more buses that connect to a plurality of hardware components of the IHS; a first of the hardware components that operates according to a plurality of agreements for utilization of the first hardware component; and a remote access controller supporting remote management of the Information Handling System (IHS), the remote access controller comprising a logic unit and a memory device having instructions stored thereon that, upon execution by the logic unit, cause the remote access controller to: receive a notification of an update to a first of the plurality of agreements for utilization of the first hardware component, wherein the updated first agreement indicates a plurality of firmware modes authorized for use by the first hardware component; identify a plurality of firmware modes in a local data storage of the first hardware component; identify any firmware modes that are authorized for use by the first hardware component based on the updated first agreement and that are not in the local data storage of the first hardware component; retrieve the firmware modes that are authorized for use by the first hardware component based on the updated first agreement and that are not in the local data storage of the first hardware component; and store the retrieved firmware modes to the local data storage of the first hardware component.

In some IHS embodiments, the updated first agreement for utilization of the first hardware component is comprised within an agreement for utilization of at least one of the IHS and a chassis in which the IHS is installed. In some IHS embodiments, execution of the instructions further causes the remote access controller to: receive a firmware image comprising an update to firmware of the first hardware component; and identify a plurality of firmware modes for operation of the first hardware component comprised within the firmware image. In some IHS embodiments, execution of the instructions further causes the remote access controller to: determine whether each of the plurality of firmware modes in the received firmware image are authorized for use by the first hardware component. In some IHS embodiments, the plurality of firmware modes are determined as authorized based on a set of authorized firmware modes specified in a factory-provisioned inventory certificate of the IHS. In some IHS embodiments, execution of the instructions further causes the remote access controller to: store firmware modes received in the firmware image that are determined as authorized for use by the first hardware component to the local data storage of the first hardware component. In some IHS embodiments, execution of the instructions further causes the remote access controller to: determine when a firmware mode currently in use in the operation of the first hardware component is not included in the updated agreement for utilization of the first hardware component; and when the when a firmware mode currently in use is not included in the updated agreement, halt operations of the first hardware component and direct the first hardware component to load and operate a second firmware mode. In some IHS embodiments, execution of the instructions further causes the remote access controller to: remove the first firmware mode from the local storage of the first hardware component. In some IHS embodiments, the first hardware component comprise a storage controller and wherein a first firmware mode configures the storage controller for operation as a RAID controller and a second firmware mode configures the storage controller for operation as a host bus adapter. In some IHS embodiments, execution of the instructions further causes the remote access controller to: maintain a mapping of firmware modes that are stored in the local data storage of the first hardware component.

In various additional embodiments, methods provide multi-modal based updates to firmware utilized by a hardware component of an IHS, wherein the firmware updates are managed by a remote access controller of the IHS that provides remote management of the hardware component. The methods may include: receiving a notification of an update to an agreement for utilization of the hardware component, wherein the agreement indicates a plurality of firmware modes authorized for use by the hardware component; identifying a plurality of firmware modes in a local data storage of the hardware component; identifying any firmware modes that are authorized for use by the hardware component based on the updated agreement and that are not in the local data storage of the hardware component; retrieving the firmware modes that are authorized for use by the hardware component based on the updated agreement and that are not in the local data storage of the hardware component; and storing the retrieved firmware modes to the local data storage of the hardware component.

In some method embodiments, the updated agreement for utilization of the hardware component is comprised within an agreement for utilization of at least one of the IHS and a chassis in which the IHS is installed. Some method embodiments may include: receiving a firmware image comprising an update to firmware of the hardware component; and identifying a plurality of firmware modes for operation of the hardware component comprised within the firmware image. Some method embodiments may include determining whether each of the plurality of firmware modes in the received firmware image are authorized for use by the hardware component. In some method embodiments, the plurality of firmware modes are determined as authorized based on a set of authorized firmware modes specified in a factory-provisioned inventory certificate of the IHS. Some method embodiments may include determining when a firmware mode currently in use in the operation of the hardware component is not included in the updated agreement for utilization of the hardware component; and when the when a firmware mode currently in use is not included in the updated agreement, halting operations of the hardware component and direct the hardware component to load and operate a second firmware mode.

In various additional embodiments, systems may include: a hardware component of an Information Handling System (IHS), wherein the hardware component comprises a persistent storage, and wherein the hardware component may be adapted to operate according to a plurality of agreements for utilization of the hardware component; and a remote access controller supporting remote management of the hardware component of the IHS, the remote access controller comprising a logic unit and a memory device having instructions stored thereon that, upon execution by the logic unit, cause the remote access controller to: receive a notification of an update to a first of the plurality of agreements for utilization of the hardware component, wherein the updated first agreement indicates a plurality of firmware modes authorized for use by the hardware component; identify a plurality of firmware modes in a local data storage of the hardware component; identify any firmware modes that are authorized for use by the hardware component based on the updated first agreement and that are not in the local data storage of the hardware component; retrieve the firmware modes that are authorized for use by the hardware component based on the updated first agreement and that are not in the local data storage of the hardware component; and store the retrieved firmware modes to the local data storage of the hardware component.

In some system embodiments, the updated first agreement for utilization of the hardware component is comprised within an agreement for utilization of at least one of the IHS and a chassis in which the IHS is installed. In some system embodiments, execution of the instructions further causes the remote access controller to: determine when a firmware mode currently in use in the operation of the hardware component is not included in the updated agreement for utilization of the hardware component; and when the when a firmware mode currently in use is not included in the updated agreement, halt operations of the hardware component and direct the hardware component to load and operate a second firmware mode. In some system embodiments, execution of the instructions further causes the remote access controller to: remove the first firmware mode from the local storage of the first hardware component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
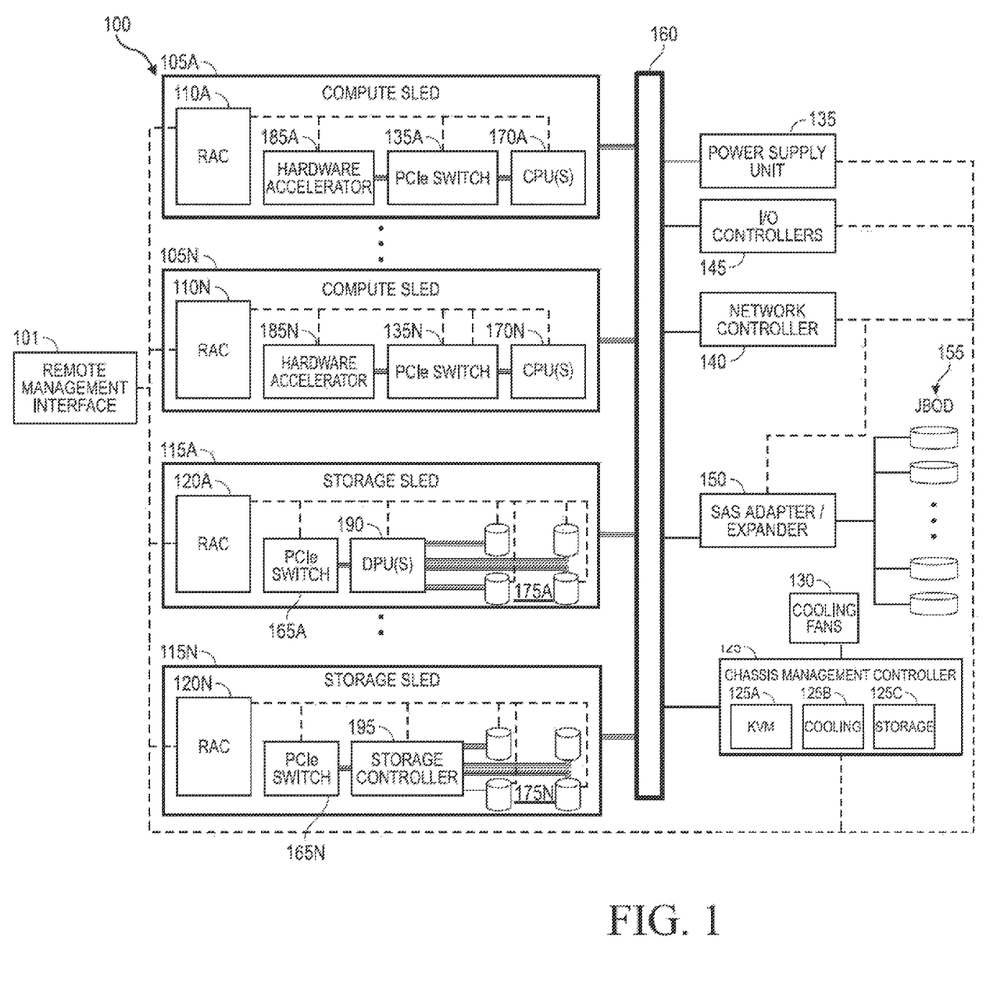
FIG. 1 is a diagram illustrating certain components of a chassis configured, according to some embodiments, for multi-modal updates to firmware used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for multi-modal updates to firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components. In some embodiments, such firmware updates may be used to enable and disable features of an IHS and/or chassis that have been licensed for use by an owner or operator of the chassis 100, where the features that have been enabled and conditions for use of the enabled features may be set forth in a service agreement that is associated with the chassis 100. As described in additional detail below, in embodiments, multi-modal firmware updates may be utilized in enabling and disabling features of a component of chassis 100 in response to changes in service agreements related to the chassis 100.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks. In some instances, firmware updates to hardware accelerators 185a-n may serve to adapt the hardware accelerator for a particular computing function, or for a particular operating environment. In embodiments, firmware updates to hardware accelerators 185a-n may be used to enable and disable features supported by the hardware accelerators, such as in response to changes in a service agreement related to the hardware accelerators and/or chassis 100.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
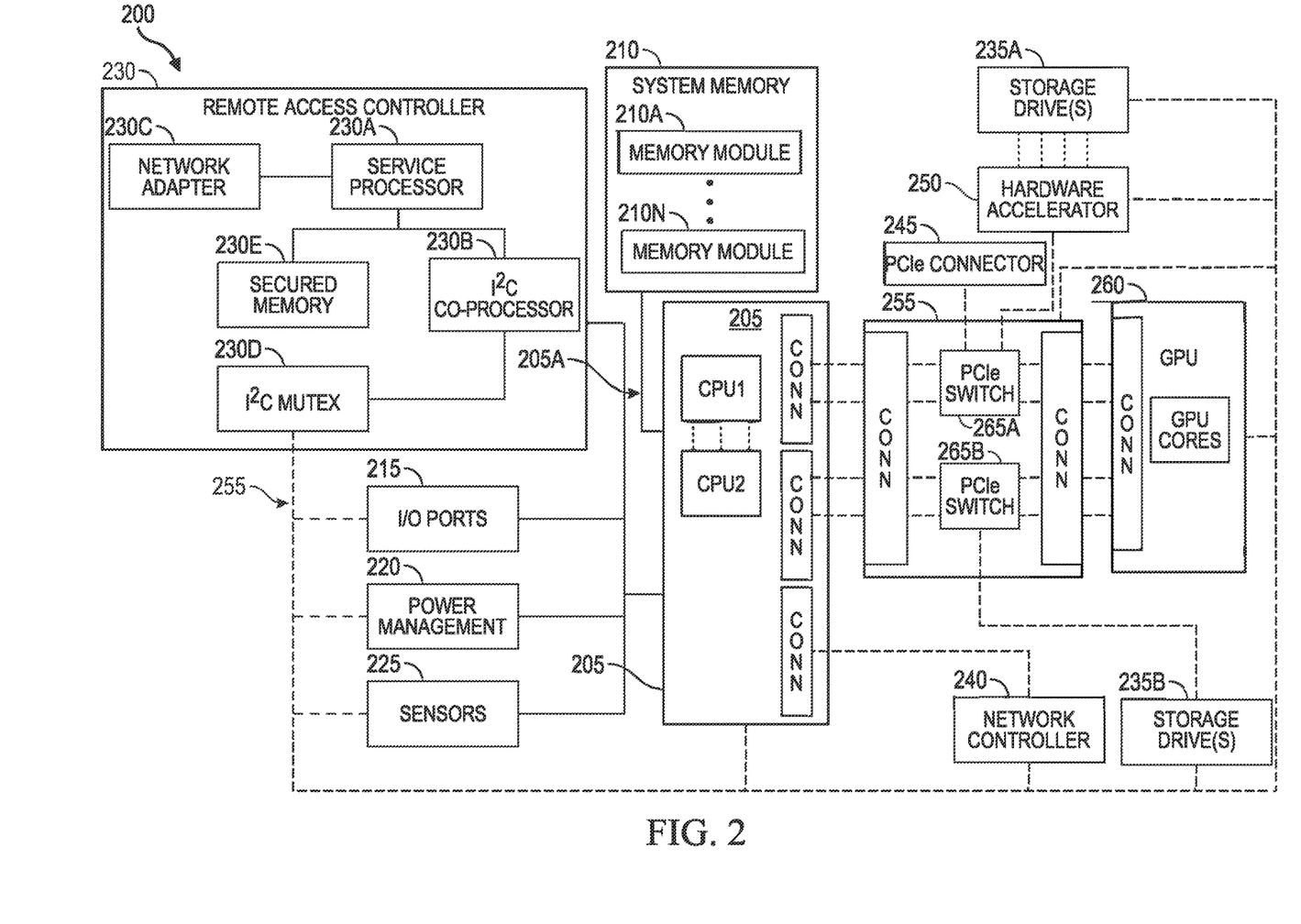
FIG. 2 is a diagram illustrating certain components of an IHS configured, according to some embodiments, for multi-modal updates to firmware used by hardware components of the IHS.

In certain embodiments, each individual sled 105a-n, 115a-n—n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made as quickly as possible, such that the hardware component, and in some cases the entire chassis, are out of service for as little time as possible. Firmware images may be relatively large files that may take several minutes to transmit to the hardware component being updated.

Firmware updates may be used to enable and disable features supported by various hardware components of chassis 100, such as in response to changes in a service agreement related to the chassis 100. For instance, a service agreement may allow a network controller 140 to be adapted for operation using either Ethernet or InfiniBand protocols, where the adaptations may be made via an update to the firmware utilized to operate the network controller 140. In modern data centers, the service agreements that govern the operation of a chassis 100 and/or its individual components may be fluid in nature, with this fluidity increasing as short-term rental of data center resources becomes more commonplace. Accordingly, it is preferable to avoid transmission of updated firmware to a hardware component each time there is a change in a service agreement related to that hardware component.

A firmware image may take tens of minutes to transmit to a hardware component, regardless of the signaling pathway used for the transmission. During this interval during which the firmware image is being transmitted, numerous types of errors can occur in the IHS, elsewhere within a shared chassis, in the remote access controller, in the hardware component being updated and/or in another hardware component that shares use of the signaling pathway being used to transmit the firmware image. Due to such errors during transmission of the firmware image, the hardware component being updated may be left in an undefined and/or inoperable state that requires manual administration of the device, and in some instances, may render the managed hardware component permanently inoperable. Accordingly, the less frequently updated firmware is transmitted to a hardware component in order to update its firmware, the fewer opportunities for error conditions to occur that can remove a chassis and/or hardware components out of service. Second, the time required to transmit updated firmware to a hardware component represents a delay in actually updating the operations of the hardware component, where this delay reduces the availability of chassis 100. In embodiments, multi-modal firmware is transmitted to managed hardware components. Such transmissions of multi-modal firmware can be made infrequently and during idle intervals by a managed hardware component, thus limiting opportunities for errors during these updates. As described in additional detail below, with the multi-modal firmware locally stored by a managed hardware component, embodiments support rapid loading of new firmware to reflect changes in service agreements related to chassis 100, thus improving availability of the chassis.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 110a-n, 120a-n, without having to reboot the chassis or any of the sleds 110a-n, 120a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface. In embodiments, remote management interface 101 may be utilized to make changes service agreements related to chassis 100 and/or IHSs 105a-n, 115a-n.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated, such as to adapt these components for operation according to different personalities. In embodiments, firmware updates to compute sleds 105a-n may be used to enable and disable features supported by the compute sleds, such as in response to changes in a service agreement related to the compute sleds and/or chassis 100.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated to enable and disable features supported by the storage devices, such as in response to changes in a service agreement related to the storage devices and/or chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated to enable and disable features supported by the network controller, such as in response to changes in a service agreement related to the network controller and/or chassis 100

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as to adapt the power supply unit for operation according to different personalities.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation according to different personalities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for multi-modal updates to firmware used by the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100. As with chassis 100, firmware updates may be used to enable and disable features of IHS 200 that have been licensed for use by an owner or operator of the chassis 100, where the features that have been enabled and conditions for use of these features may be set forth in a service agreement that is associated with the IHS 200. As described in additional detail below, in embodiments, multi-modal firmware updates may be utilized in enabling and disabling features of IHS 200 in response to changes in service agreements related to the IHS 200.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a coprocessor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated to enable and disable features supported by the network controller 240, such as in response to changes in a service agreement related to the network controller and/or IHS 200. For example, updates to the firmware of network controller 240 may be used in the described reconfiguration of a network controller 240 between support for InfiniBand or Ethernet protocols.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated to enable and disable features supported by the PCIe switches 265*a-b*, such as in response to changes in a service agreement related to the PCIe switches 265*a-b* and/or IHS 200.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated to enable and disable features supported by the storage drives 235*a-b*, such as in response to changes in a service agreement related to the storage drives 235*a-b* and/or IHS 200.

As illustrated, PCIe switch 265*a* is coupled via a PCIe link to a hardware accelerator 250, such as a DPU, SmartNIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing) (i.e., x86) cores. Hardware accelerator may operate according to firmware instructions that may be occasionally updated to enable and disable features supported by the hardware accelerator 250, such as in response to changes in a service agreement related to the hardware accelerator 250 and/or IHS 200.

In the illustrated embodiment, the programmable capabilities of hardware accelerator 250 implements functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions. As described, in some embodiments, updates to firmware utilized by hardware accelerators 250 may enable and disable features supported by the hardware accelerators 250, such as in response to changes in a service agreement related to the hardware accelerators 250 and/or IHS 200. For instance, a firmware update in response to a change in a service agreement that governs the available features of hardware accelerator 250 may enable offloading, to hardware accelerator 250, particular storage operations directed at storage drives 235*a*, while another firmware update may enable offloading, to hardware accelerator 250, machine learning or other artificial intelligence operations that utilize the storage drives 235*a*, such as in utilizing stored image data for training of machine vision models.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated to enable and disable features supported by GPUs 260, such as in response to changes in a service agreement related to GPUs 260 and/or IHS 200.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245*a*, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

As described in additional detail below, remote access controller 230 embodiments may support capabilities for managing multi-modal firmware updates to managed hardware components 205, 235a-b, 240, 250, 255, 260. In embodiments, remote access controller 230 receives updates for multi-modal firmware that is utilized by managed hardware components 205, 235a-b, 240, 250, 255, 260. Remote access controller 230 may then transmit received multi-modal firmware to a managed hardware component 205, 235a-b, 240, 250, 255, 260 and may maintain a mapping of the multi-modal firmware that is locally stored by each of the managed hardware components. In embodiments, the remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
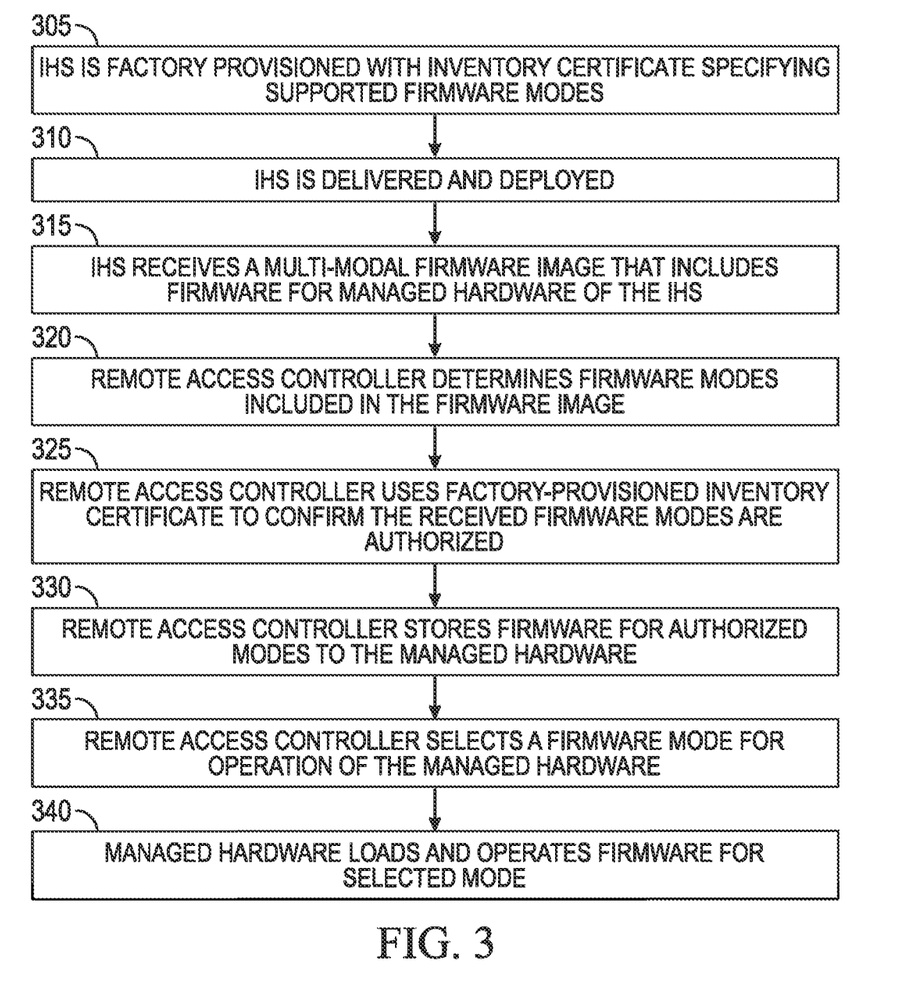
FIG. 3 is a flow chart diagram illustrating certain steps of methods, according to some embodiments, for multi-modal updates to firmware used by hardware components of an IHS.

FIG. 3 is a flow chart diagram illustrating certain steps of methods, according to some embodiments, for multi-modal updates to firmware used by hardware components of an IHS, such as the IHSs described with regard to FIGS. 1 and 2. Some embodiments of the method of FIG. 3 may begin, at block 305, with the factory assembly and provisioning of an IHS, such as a server IHS described with regard to FIGS. 1 and 2, where the IHS is provisioned to include an inventory certificate that is cryptographically bound to the IHS and that specifies the firmware modes that are authorized for use by certain of the hardware components of the IHS.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. The manifest generated during assembly of an IHS is provided to the factory provisioning application that will being used to provision the assembled IHS, which includes installing firmware and other software on the IHS. Accordingly, as part of this factory provisioning, firmware modes and associated firmware settings may be uploaded and installed to various hardware components of the IHS.

In some embodiments, the firmware modes uploaded to the IHS during factory provisioning may be determined based on a service agreement for the IHS that was selected by a customer as part of the purchase and configuration of the IHS. For example, as described, a storage controller may be reconfigured through use of different firmware modes between operation as a RAID controller and operation as a HBA. During factory provisioning of an IHS that includes such a programmable storage controller, the service agreement selected for the IHS may authorize use of both of these firmware modes for a storage controller. While in other instances, the service agreement for the IHS may only authorize use of the storage controller in one of these firmware modes. In this manner, the service agreement for the IHS may be consulted in order to determine the firmware modes to be installed to the IHS as part of the factory provisioning.

Once the firmware modes for an IHS has been selected, the factory provisioning application may confirm the authenticity and integrity of the selected firmware based on digital signatures provided by hardware component manufacturers or other entities providing the firmware. The manifest of the IHS may then be updated to identify the firmware modes that are supported by the IHS and may also be updated to include digital signatures associated with each of the supported firmware modes. In this manner, the factory-provisioning system may upload one or more supported firmware modes to at least some of the factory-installed hardware components of an IHS.

Based on the hardware inventory information and the firmware modes specified in the manifest of the IHS, the factory provisioning application may initiate generation of an inventory certificate that may be used to validate that the detected hardware components of the IHS are the same hardware components that were installed during the factory assembly of the IHS and/or to validate that firmware modes are authorized for use by the IHS. As described with regard to FIGS. 1 and 2, an IHS may include a remote access controller that provides capabilities for remote management of an IHS, where these remote management capabilities may include sideband management of various hardware components of an IHS. In some embodiments, the generation of an inventory certificate for a newly assembled IHS may be initiated via a request from the factory provisioning application to the remote access controller of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate by generating a cryptographic key pair for use in validating the authenticity of inventory information, including the authorized firmware modes that are specified in an inventory certificate.

In some embodiments, the remote access controller generates a certificate signing request (CSR) for a digital identity certificate, where the request specifies the public key of the key pair generated by the remote access controller, and also specifies the factory installed hardware inventory from the manifest that was generated during assembly of the IHS, and also specifies an inventory of the authorized firmware modes for at least some of the hardware components of the IHS. The factory installed and provisioned hardware and firmware inventory information included in the CSR may be signed by the remote access controller using the private key from the generated keypair. The CSR for the requested inventory certificate may then be transmitted to the factory provisioning application.

The factory provisioning application may submit the CSR for signing by a factory certificate authority. Upon receipt of the CSR, the factory certificate authority parses from the CSR: the hardware inventory information, the inventory of authorized firmware modes for the IHS, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS and the inventory of authorized firmware modes of the IHS.

The factory certificate authority may submit the generated inventory certificate for signing by a hardware security module that may be a dedicated hardware component of a factory provisioning server that safeguards cryptographic keys and implements cryptographic functions utilized in the factory provisioning process. The hardware security module digitally signs the submitted inventory certificate, which is then returned to the factory provisioning application. In some embodiments, the factory provisioning application may retain a copy of the signed inventory certificate. In some instances, the copy of the inventory certificate may be retained to a data store utilized in providing ongoing support of the IHS once it has been shipped and has been deployed by a customer, such as in issuing an updated inventory certificate for an IHS in response to a change in service agreements for the IHS that result in a change to the authorized firmware modes of the IHS.

The signed inventory certificate may then be loaded to the assembled IHS as part of the factory provisioning of the IHS. In some embodiments, the signed inventory certificate may be uploaded to a secured memory of the remote access controller, such as described with regard to FIG. 2. With the generation and validation of the signed inventory certificate completed, additional factory provisioning of the assembled IHS may be completed and, at 310, the assembled IHS is shipped from the factory to a customer. The IHS may be received at a data center and further provisioned for deployment within a specific computing and/or storage cluster of the data center.

With the IHS operating using the factory provisioned firmware, at 315, an IHS receives a firmware image that includes a multi-modal firmware update for one or more managed hardware components of the IHS. As described with regard to FIG. 1, datacenter administrators may utilize a remote management interface 101 to initiate a variety of management operations on a chassis, IHSs installed the chassis, and managed components of the respective IHSs. According, at 315 of FIG. 3, a remote management interface may be utilized to initiate a firmware update for one or more managed hardware components operating within the data center, where the firmware update includes a multi-modal firmware image that includes firmware supporting two or more modes of operation for one or more managed hardware components.

For instance, a remote management interface may be utilized to initiate a firmware update for all storage drives of a particular type that are operating within a data center or within any sub-system of the data center, such as a firmware update for all storage drives of a particular model number that are part of a storage cluster. The firmware update may include a multimodal firmware image that includes one firmware mode for operation of these storage drives using an elevated encryption and security protocols and another firmware mode of operation of these storage drives using standard security procedures. In another example, a remote management interface may be utilized to initiate a discrete multimodal update to the firmware of a particular device, such as to update the firmware used to configure the programmable capabilities of a hardware accelerator. This firmware update may include a multimodal firmware image that includes one firmware mode for programming the hardware accelerator for offloading I/O operations directed at a cluster of storage drives and another firmware mode for programming the hardware accelerator for implementing processing of data using specific encryption protocols.

Such multimodal firmware updates may be initiated by an administrator that is using a remote management interface. The multimodal firmware update may include delivery of a firmware image to a remote access controller of the IHS in which the hardware component to be updated is installed. Embodiments may continue, at 320, with the remote access controller determining the different firmware modes that are included in the received firmware image. In some embodiments, the remote access controller determines the modes included in a firmware image based on metadata included in the firmware image. For instance, the metadata of a firmware image may include a mapping of firmware boundaries within the image, where the boundaries delineate different types of firmware within the firmware image, such as different firmware modes. Based on the firmware boundaries set forth in the metadata of the firmware image, embodiments may identify regions of the firmware image that correspond to firmware for different supported firmware modes. In some embodiments, the characteristics of the firmware boundaries within the image may be compared against characteristics of the authorized firmware specified in the inventory certificate in order to identify individual firmware modes within a firmware image.

As described, an IHS may be factory provisioned to include an inventory certificate that specifies the factory installed hardware and/or software of the IHS, including the factory installed and authorized firmware modes. In some embodiments, each factory installed firmware mode corresponds to a set of features of the IHS that can be licensed, and thus enabled. At 325, the remote access controller utilizes the factory-installed inventory certificate to confirm that each of the firmware modes included in the received firmware image correspond to authorized firmware modes. As described, in some instances a network controller may be reconfigured via a firmware update between operations in an Ethernet mode and operations in an InfiniBand mode. For embodiments includes such storage controllers, an inventory certificate for the IHS may specify a firmware mode for Ethernet operations by the network controller, but may not specify a firmware mode for InfiniBand operations. Accordingly, embodiments may determine based on the inventory certificate for the IHS that an InfiniBand firmware mode included in a received firmware update is not authorized for use on the IHS, in which case the received InfiniBand firmware mode is not transmitted to the network controller.

Once the remote access controller has determined that the received firmware modes are authorized for operation on the IHS, at 330, the remote access controller stores the received firmware modes to a local storage of the managed hardware component. In some embodiments, a local persistent storage of the managed hardware components may be logically divided into memory regions or slots that are used to store firmware for specific firmware modes. In some embodiments, each slot of the local storage of the managed hardware component may be designated for storage of a firmware for a specific mode of operations by the hardware component. Once the received firmware modes have been stored to the local storage of the hardware component, at 355, a firmware mode is selected for use in operation of the hardware component. In some embodiments, the remote access controller selects the firmware mode of the IHS based on a service agreement that governs the operation of the hardware component, IHS and/or chassis. In some embodiments, the remote access controller specifies the slot of the local storage of the managed hardware component from which to reinitialize the managed hardware component.

At 340, the managed hardware component loads firmware for the mode identified by the remote access controller. In some instances, loading of this firmware mode results in a change in mode by the managed hardware component, such as switching operations of a storage controller from a RAID controller to an HBA. In other instances, loading of this firmware mode results in an upgrade to the existing operations of the managed hardware component, such as a storage controller configured as a RAID controller that receives upgraded firmware for improved operations as a RAID controller. Upon loading of the firmware, the managed component continues its operations according to the operative service agreements for the managed component, the IHS and/or the chassis in which the IHS is installed.

Figure 4:
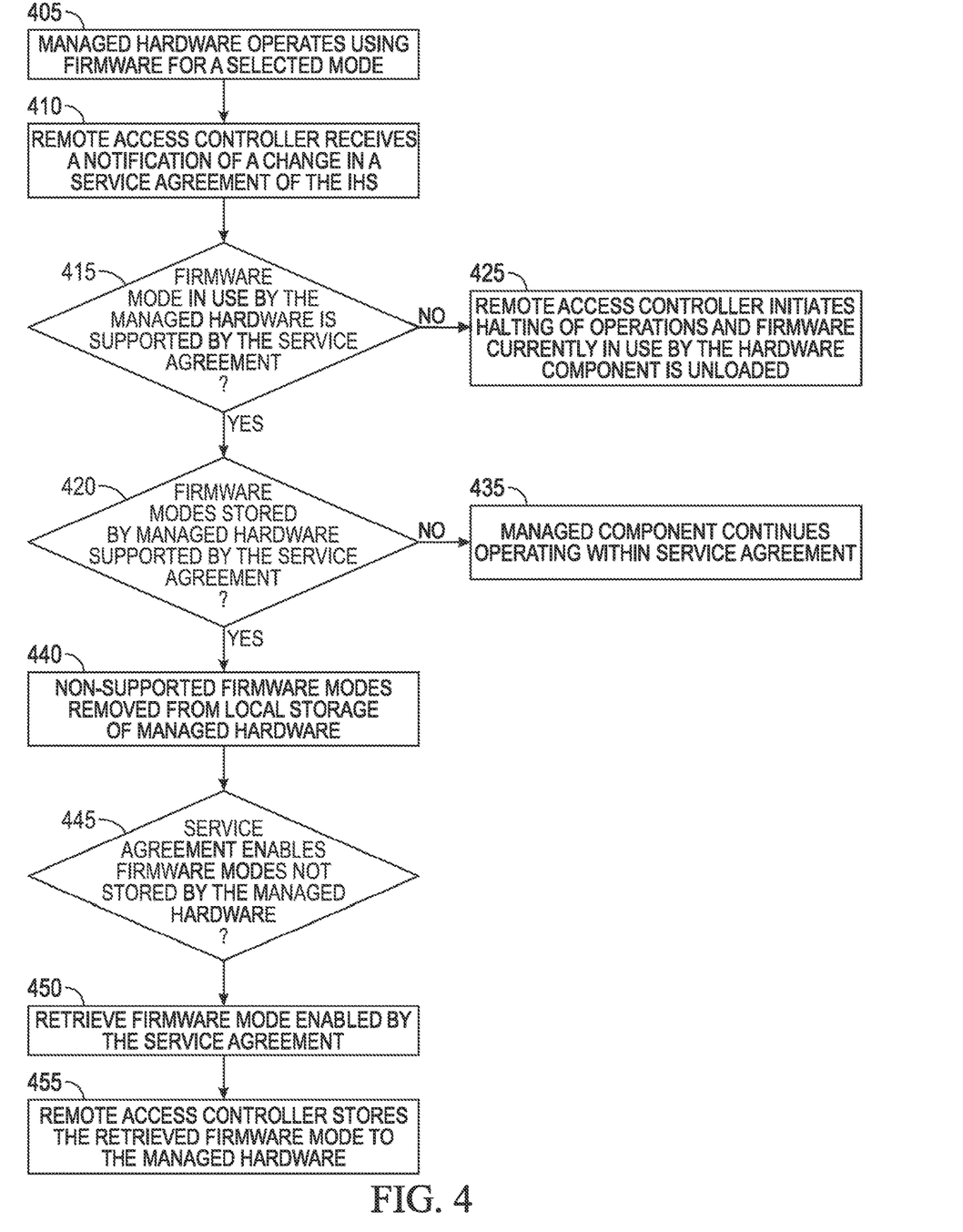
FIG. 4 is a flow chart diagram illustrating certain steps of additional methods, according to some embodiments, for multi-modal updates to firmware used by hardware components of an IHS.

FIG. 4 is a flow chart diagram illustrating certain steps of additional methods, according to some embodiments, for multi-modal updates to firmware used by hardware components of an IHS. Embodiments of FIG. 4 may being at 405 with the operation of a managed hardware component of an IHS using a firmware mode that was previously validated and delivered to the managed hardware by a remote access controller of the IHS, such as described with regard to FIG. 3. At 410, the remote access controller receives a notification of a change to the operative service agreement of the IHS, the chassis in which the IHS is installed and/or a specific hardware component of the IHS. In some embodiments, the remote access controller may receive such a notification from a remote management interface that may interoperate with a cloud-based system used to manage licensed entitlements associated with an IHS, where these entitlement may include service agreements that authorize use of various firmware modes that provide specialized capabilities for specific hardware components of the IHS.

At 415, the remote access controller determines the current firmware mode in which the managed hardware component is operating. In some embodiments, the remote access controller may query the managed hardware component to determine the firmware mode that is currently in use. In some embodiments, the remote access controller may maintain a firmware mode map that tracks the firmware modes that are locally stored by each managed hardware component of an IHS, and that also is used to track the firmware mode currently in use by each hardware component. Using such a map of tracked firmware modes, the remote access controller determines the current firmware mode of a managed hardware component. The remote access controller may then determine whether the current firmware mode is present in the updated service agreement received in the notification of block 410. In some instances, the updated service agreement may specify new firmware modes that have been made available for use by a managed hardware component. However, in some instances, the updated service agreement may specify fewer or different firmware modes than were included in the prior service agreement.

Accordingly, in some instances, the current firmware mode of a managed hardware component is no longer supported, where this determination may be made by the remote access controller based on the current firmware mode not being included in the updated service agreement. As indicated at 425, in such instances, the remote access controller initiates halting of the current operations of the managed hardware component. In some instances, the current operations of the managed hardware component may be immediately halted. In other instances, shutdown procedures may be initiated that perform a managed exit from the operations of the managed hardware component. Once halted, the firmware mode that is no longer supported may be removed from the local storage of the managed hardware. The halted firmware component may then be initialized to operate using another firmware mode, such as a locally stored default firmware mode or another available firmware mode.

As indicated in FIG. 4, in scenarios where the firmware in use by the managed hardware component is supported by the updated service agreement, at 420, the remote access controller determines whether the other firmware modes that are locally stored by the managed hardware component are supported by the updated service agreement. As described, for use in making such determinations, the remote access controller may maintain a mapping of firmware modes that are locally stored by the managed hardware component, such as a mapping of the firmware modes that are locally stored by the hardware component and the slots or memory regions in which each of the firmware modes is stored. In other embodiments, such determinations may be made through queries to the managed hardware component, such as using the sideband management capabilities of a remote access controller, such as described with regard to FIG. 2. In scenarios where the firmware modes stored locally by the managed hardware component are all supported by the updated service agreement, at 435, the managed hardware component may continue operating according to the current firmware mode.

In scenarios where any firmware modes stored locally by the managed hardware component are not supported by the updated service agreement, at 440, those firmware modes are removed from the local storage of the managed hardware component. Embodiments may continue, at 445, with the remote access controller determining whether the updated service agreement authorizes use of any firmware modes that are not already locally stored by the managed hardware component. For instance, for a managed hardware component that is a network controller that may be reconfigured between an Ethernet firmware mode and an InfiniBand firmware mode, an updated service agreement may authorize use of one of these modes.

For any such firmware modes that have been authorized for use by a managed hardware component, at 450, the remote access controller retrieves the firmware needed to enable use of these newly authorized firmware modes by the managed hardware component. In some instances, the remote access controller may retrieve this firmware from a remote management interface or from a cloud resource that supports data center operations. The retrieved firmware modes may then be stored, at 455, to the local data storage of the managed hardware component, where the firmware mode can be quickly loaded and utilized by the managed hardware in response to additional changes in a service agreement that governs the operation of the hardware component, or based on other conditions that may trigger a switch between operation of the hardware component according to different available firmware modes.

As described, the more quickly the firmware of the hardware component can be updated, the more quickly the hardware component can initiate operations using the updated firmware. In addition, avoiding transmission of firmware to the managed component reduces the interval during which an error may be encountered during transmission and reduces possibility of firmware update errors that can render a component inoperable. In this manner, embodiments support rapid reconfiguration of a managed hardware component between different firmware modes, while minimizing possible disruptions while switching between different firmware modes supported by a managed hardware component. Embodiments provide these capabilities while ensuring that the firmware available for use by an IHS remains consistent with service agreements applicable to that IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs utilizing one or more buses that connect to a plurality of hardware components of the IHS;
a first of the hardware components that operates according to a plurality of agreements for utilization of the first hardware component; and
a remote access controller supporting remote management of the Information Handling System (IHS), the remote access controller comprising a logic unit and a memory device having instructions stored thereon that, upon execution by the logic unit, cause the remote access controller to:
receive a notification of an update to a first of the plurality of agreements for utilization of the first hardware component, wherein the updated first agreement indicates a plurality of firmware modes authorized for use by the first hardware component;
identify a plurality of firmware modes in a local data storage of the first hardware component;
identify any firmware modes that are authorized for use by the first hardware component based on the updated first agreement and that are not in the local data storage of the first hardware component;
retrieve the firmware modes that are authorized for use by the first hardware component based on the updated first agreement and that are not in the local data storage of the first hardware component;
store the retrieved firmware modes to the local data storage of the first hardware component;
determine when a firmware mode currently in use in operation of the first hardware component is not included in the updated agreement for utilization of the first hardware component; and
when the firmware mode currently in use is not included in the updated agreement, halt operations of the first hardware component and direct the first hardware component to load and operate a second firmware mode.

2. The IHS of claim 1, wherein the updated first agreement for utilization of the first hardware component is comprised within an agreement for utilization of at least one of the IHS and a chassis in which the IHS is installed.

3. The IHS of claim 1, wherein execution of the instructions further causes the remote access controller to:
receive a firmware image comprising an update to firmware of the first hardware component; and
identify a plurality of firmware modes for operation of the first hardware component comprised within the firmware image.

4. The IHS of claim 3, wherein execution of the instructions further causes the remote access controller to:
determine whether each of the plurality of firmware modes in the received firmware image is authorized for use by the first hardware component.

5. The IHS of claim 4, wherein the plurality of firmware modes are determined to be authorized based on a set of authorized firmware modes specified in a factory-provisioned inventory certificate of the IHS.

6. The IHS of claim 4, wherein execution of the instructions further causes the remote access controller to:
store firmware modes received in the firmware image that are determined to be authorized for use by the first hardware component to the local data storage of the first hardware component.

7. The IHS of claim 1, wherein execution of the instructions further causes the remote access controller to:
remove the first firmware mode from the local storage of the first hardware component.

8. The IHS of claim 1, wherein the first hardware component comprises a storage controller and wherein a first firmware mode configures the storage controller for operation as a RAID controller and a second firmware mode configures the storage controller for operation as a host bus adapter.

9. The IHS of claim 1, wherein execution of the instructions further causes the remote access controller to:
maintain a mapping of firmware modes that are stored in the local data storage of the first hardware component.

10. A method for multi-modal based updates to firmware utilized by a hardware component of an IHS (Information Handling System), wherein the firmware updates are managed by a remote access controller of the IHS that provides remote management of the hardware component, the method comprising:
receiving a notification of an update to an agreement for utilization of the hardware component, wherein the agreement indicates a plurality of firmware modes authorized for use by the hardware component;
identifying a plurality of firmware modes in a local data storage of the hardware component;

identifying any firmware modes that are authorized for use by the hardware component based on the updated agreement and that are not in the local data storage of the hardware component;

retrieving the firmware modes that are authorized for use by the hardware component based on the updated agreement and that are not in the local data storage of the hardware component;

storing the retrieved firmware modes to the local data storage of the hardware component, and determining when a firmware mode currently in use in operation of the first hardware component is not included in the updated agreement for utilization of the first hardware component; and when the firmware mode currently in use is not included in the updated agreement, halting operations of the first hardware component and directing the first hardware component to load and operate a second firmware mode.

11. The method of claim 10, wherein the updated agreement for utilization of the hardware component is comprised within an agreement for utilization of at least one of the IHS and a chassis in which the IHS is installed.

12. The method of claim 10, further comprising:
receiving a firmware image comprising an update to firmware of the hardware component; and
identifying a plurality of firmware modes for operation of the hardware component comprised within the firmware image.

13. The method of claim 12, further comprising: determining whether each of the plurality of firmware modes in the received firmware image is authorized for use by the hardware component.

14. The method of claim 13, wherein the plurality of firmware modes are determined to be authorized based on a set of authorized firmware modes specified in a factory-provisioned inventory certificate of the IHS.

15. A system comprising:
a hardware component of an Information Handling System (IHS), wherein the hardware component comprises a persistent storage, and wherein the hardware component may be adapted to operate according to a plurality of agreements for utilization of the hardware component; and a remote access controller supporting remote management of the hardware component of the IHS, the remote access controller comprising a logic unit and a memory device having instructions stored thereon that, upon execution by the logic unit, cause the remote access controller to:

receive a notification of an update to a first of the plurality of agreements for utilization of the hardware component, wherein the updated first agreement indicates a plurality of firmware modes authorized for use by the hardware component;

identify a plurality of firmware modes in a local data storage of the hardware component;

identify any firmware modes that are authorized for use by the hardware component based on the updated first agreement and that are not in the local data storage of the hardware component;

retrieve the firmware modes that are authorized for use by the hardware component based on the updated first agreement and that are not in the local data storage of the hardware component; and store the retrieved firmware modes to the local data storage of the hardware component, and determine when a firmware mode currently in use in operation of the first hardware component is not included in the updated agreement for utilization of the first hardware component; and when the firmware mode currently in use is not included in the updated agreement, halt operations of the first hardware component and direct the first hardware component to load and operate a second firmware mode.

16. The system of claim 15, wherein the updated first agreement for utilization of the hardware component is comprised within an agreement for utilization of at least one of the IHS and a chassis in which the IHS is installed.

17. The system of claim 15, wherein execution of the instructions further causes the remote access controller to:
remove the first firmware mode from the local storage of the first hardware component.

* * * * *